(12) United States Patent
Trachewsky et al.

(10) Patent No.: US 8,170,504 B2
(45) Date of Patent: *May 1, 2012

(54) MODIFIED PREAMBLE FOR PROGRAMMABLE TRANSMITTER

(75) Inventors: Jason A. Trachewsky, Menlo Park, CA (US); Rajendra Tushar Moorti, Mountain View, CA (US); Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/116,227

(22) Filed: May 26, 2011

(65) Prior Publication Data

US 2011/0228875 A1 Sep. 22, 2011

Related U.S. Application Data

(63) Continuation of application No. 12/498,351, filed on Jul. 6, 2009, now Pat. No. 7,974,591, which is a continuation of application No. 11/403,094, filed on Apr. 11, 2006, now Pat. No. 7,558,537.

(60) Provisional application No. 60/689,932, filed on Jun. 7, 2005.

(51) Int. Cl.
*H04B 1/04* (2006.01)

(52) U.S. Cl. ............... 455/104; 455/324; 455/562.1; 375/299; 370/350

(58) Field of Classification Search .......... 455/101–104, 455/313, 323, 324, 550, 561, 562.1; 375/229, 375/232, 295, 299; 370/334, 350
See application file for complete search history.

(56) References Cited

U.S. PATENT DOCUMENTS 7,558,537 B2 * 7/2009 Trachewsky et al. ......... 455/104
7,974,591 B2 * 7/2011 Trachewsky et al. ......... 455/104

* cited by examiner

*Primary Examiner* — Nhan Le
(74) *Attorney, Agent, or Firm* — Garlick & Markison; Holly L. Rudnick

(57) ABSTRACT

A programmable transmitter generates a frame preamble to train a receiver with respect to a communication link format that corresponds to a transmission mode wherein the transmission mode may comprise transmitting the communication link over one or more antennas. Generally, the invention includes generating a preamble with an arrangement that depends upon whether a Greenfield (high data rate) or mixed mode transmission is to occur and that depends upon a number of spatial streams that are to be generated. One format for high data rate transmission includes a short training sequence, a long training sequence and a signal field. The mixed mode transmission further includes a legacy prefix.

20 Claims, 9 Drawing Sheets

High Data Rate Pre-Amble Format

Mixed Mode Legacy Pre-Amble Format

MODIFIED PREAMBLE FOR PROGRAMMABLE TRANSMITTER

CROSS REFERENCE TO RELATED PATENTS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 12/498,351, entitled "Modified Preamble for Programmable Transmitter," filed Jul. 6, 2009, pending, which claims priority pursuant to 35 U.S.C. §120, as a continuation, to the following U.S. Utility patent application which is hereby incorporated herein by reference in its entirety and made part of the present U.S. Utility patent application for all purposes:
    a. U.S. Utility application Ser. No. 11/403,094, now U.S. Pat. No. 7,558,537, entitled "Modified Preamble for Programmable Transmitter," filed Apr. 11, 2006, which claims priority pursuant to 35 U.S.C. §119(e) to the following U.S. Provisional Patent Application which is hereby incorporated herein by reference in its entirety and made part of the present U.S. Utility patent application for all purposes:
        i. U.S. Provisional Application Ser. No. 60/689,932, expired, entitled "Modified Preamble for Programmable Transmitter," filed Jun. 7, 2005.

BACKGROUND OF THE INVENTION

1. Technical Field of the Invention

This invention relates generally to wireless communication systems and in particular to a transmitter operating at high data rates within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is essentially a single-input-single-output (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a communication system. For example, high data rates can be achieved with MIMO communications in comparison to SISO communications. However, most communication systems include legacy wireless communication devices (i.e., devices that are compliant with an older version of a wireless communication standard). As such, a transmitter capable of MIMO wireless communications should also be backward compatible with legacy devices to function in a majority of existing communication systems.

In addition to the different type of wireless communications (e.g., SISO, SIMO, MISO, and MIMO), the channel bandwidth varies from standard to standard. For example, IEEE 802.11(j) prescribes a 10 MHz channel bandwidth, IEEE 802.11(a) and (g) prescribe a 20 MHz channel, and IEEE 802.11(n) is contemplating a channel bandwidth of 40 MHz. Accordingly, for a radio to be compliant with one or more of these standards, the radio transmitter must be adjustable to accommodate the different channel bandwidths and transmission modes.

Therefore, a need exists for a programmable transmitter that is capable of high data throughput, backward compatible with legacy devices and adjustable to different channel bandwidths. A need further exists for a modified pre-amble that supports high data rate and mixed-mode transmissions that are detectable by legacy devices.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
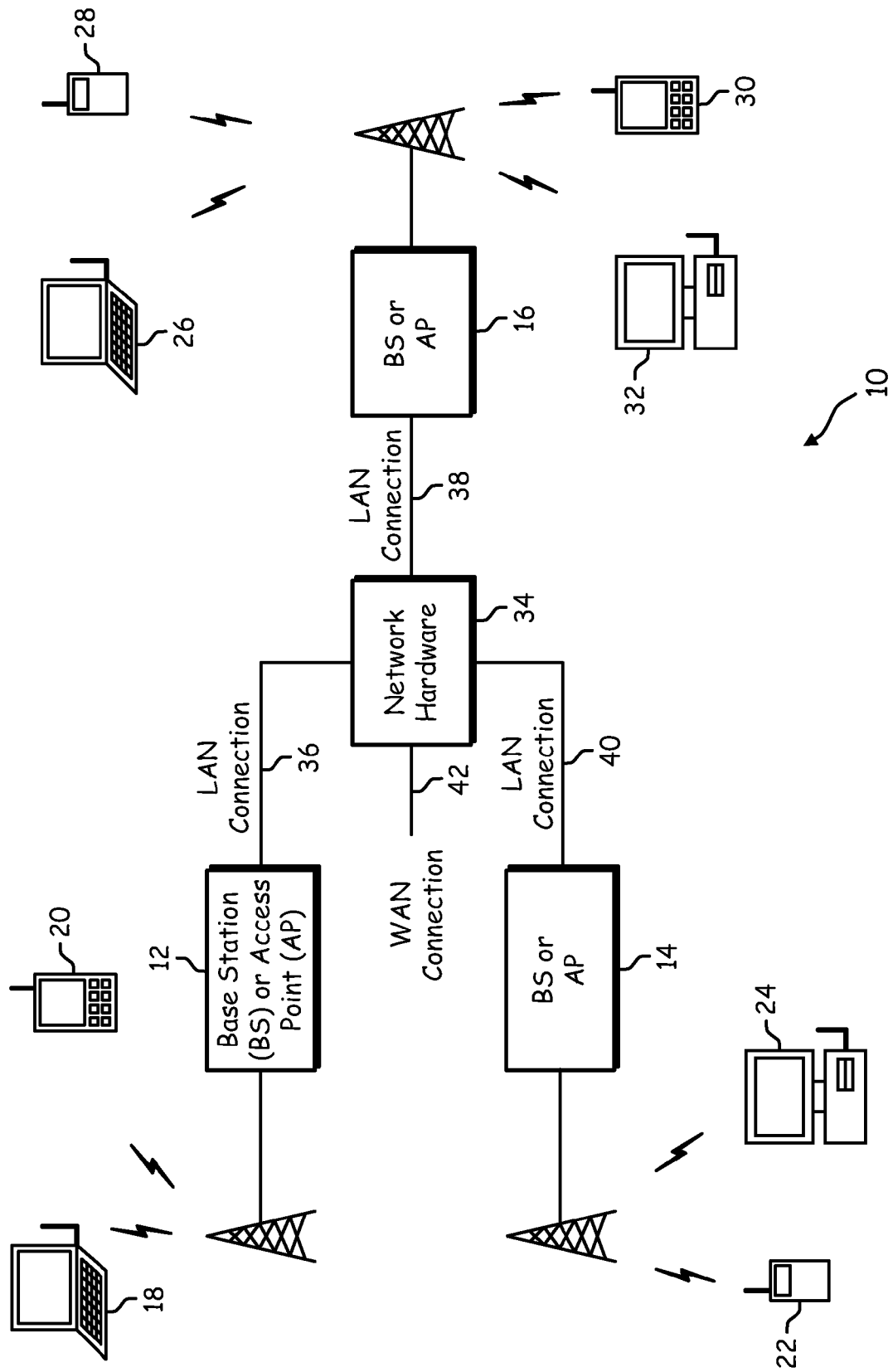
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera, provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
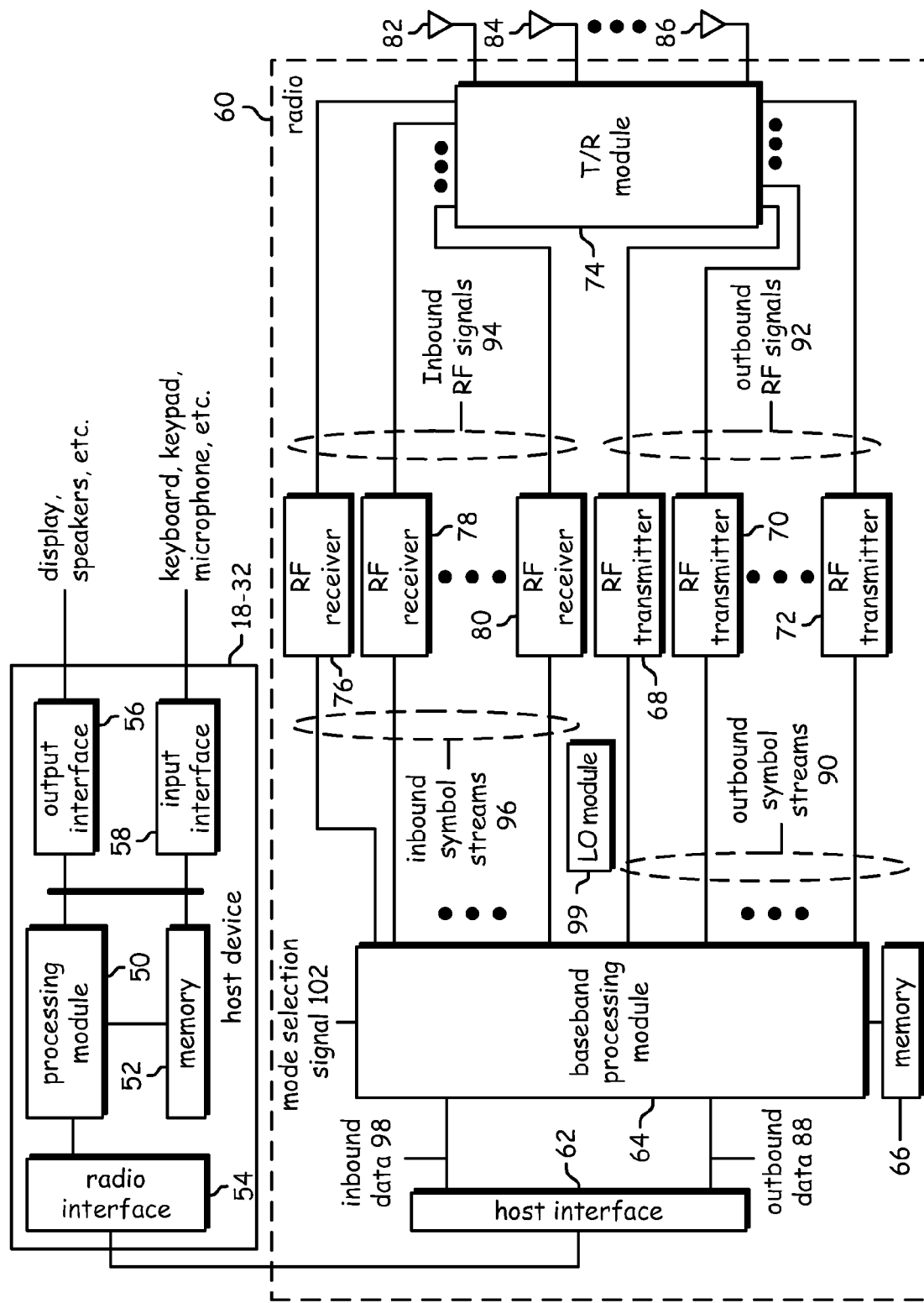
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80 and a local oscillation module 99. The baseband processing module 64, in combination with operational instructions stored in memory 66, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 101, produces one or more outbound symbol streams 90. The mode selection signal 101 indicates a particular mode of operation that is compliant with one or more specific modes of the various IEEE 802.11 standards. For example, the mode selection signal 101 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal 101 may indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per Orthogonal Frequency Division Multiplexing (OFDM) symbol (NCBPS), and/or data bits per OFDM symbol (NDBPS). The mode selection signal 101 may also indicate a particular channelization for the corresponding mode that provides a channel number and corresponding center frequency. The mode select signal 102 may further indicate a power spectral density mask value and a number of antennas to be initially used for a SISO, SIMO, MISO or MIMO communication, and a corresponding space-time and/or space-frequency encoding mode.

The baseband processing module 64, based on the mode selection signal 101 produces one or more outbound symbol streams 90 from the outbound data 88. For example, if the mode selection signal 101 indicates that a single transmit antenna is being utilized for the particular mode that has been selected, the baseband processing module 64 will produce a single outbound symbol stream 90. Alternatively, if the mode select signal 102 indicates 2, 3 or 4 antennas, the baseband processing module 64 will produce 2, 3 or 4 outbound symbol streams 90 from the outbound data 88.

Depending on the number of outbound streams 90 produced by the baseband module 64, a corresponding number of the RF transmitters 68-72 will be enabled to convert the outbound symbol streams 90 into outbound RF signals 92. In general, each of the RF transmitters 68-72 includes a digital filter and upsampling module, a digital to analog conversion module, an analog filter module, a frequency up conversion module, a power amplifier, and a radio frequency bandpass filter. The RF transmitters 68-72 provide the outbound RF signals 92 to the transmit/receive module 74, which provides each outbound RF signal to a corresponding antenna 82-86.

When the radio 60 is in the receive mode, the transmit/receive module 74 receives one or more inbound RF signals 94 via the antennas 82-86 and provides them to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 converts the inbound symbol streams 96 into inbound data 98, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3A:
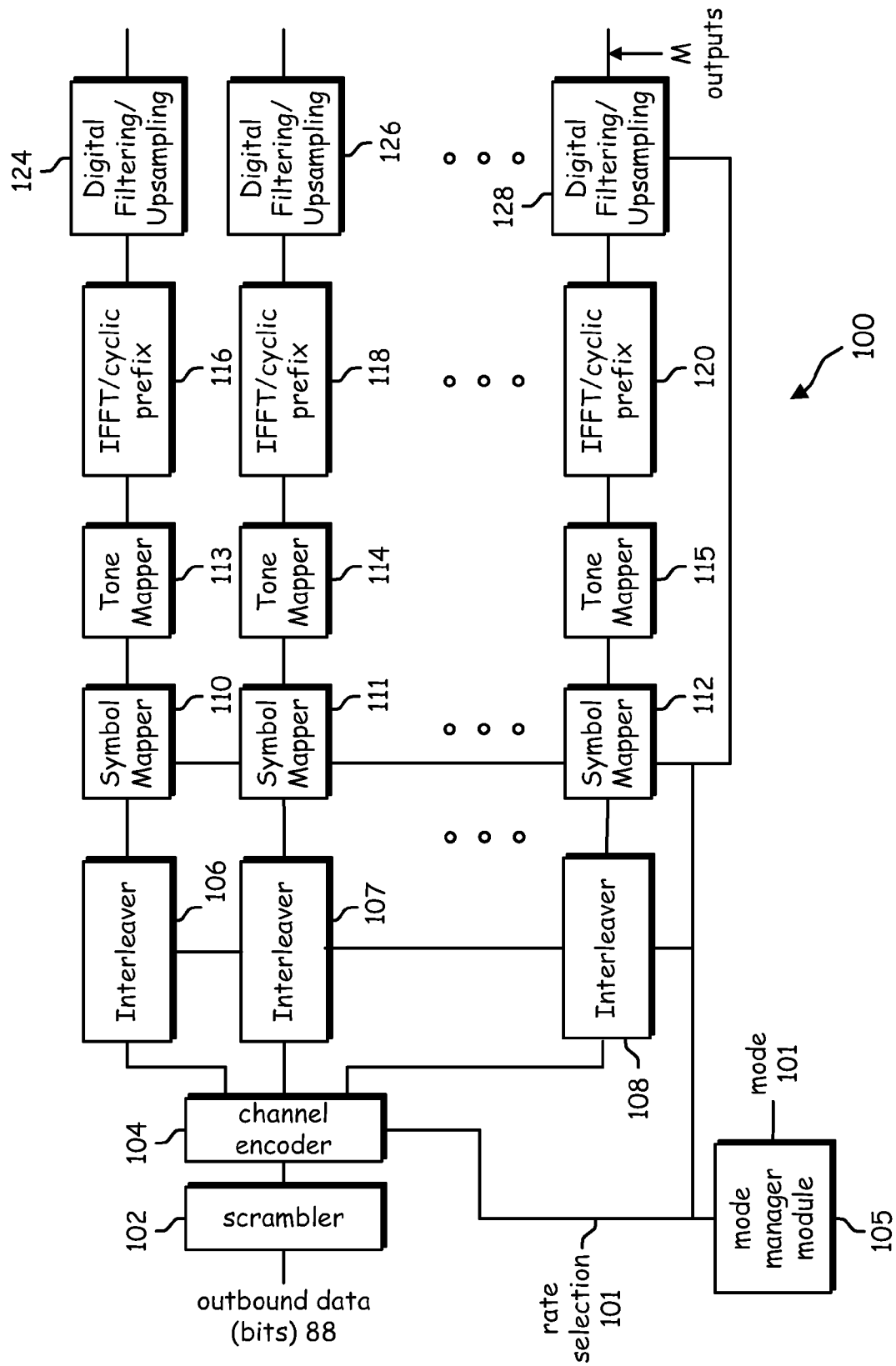
FIGS. 3A and 3B are a schematic block diagram of a radio transmitter in accordance with the present invention.
Figure 3B:
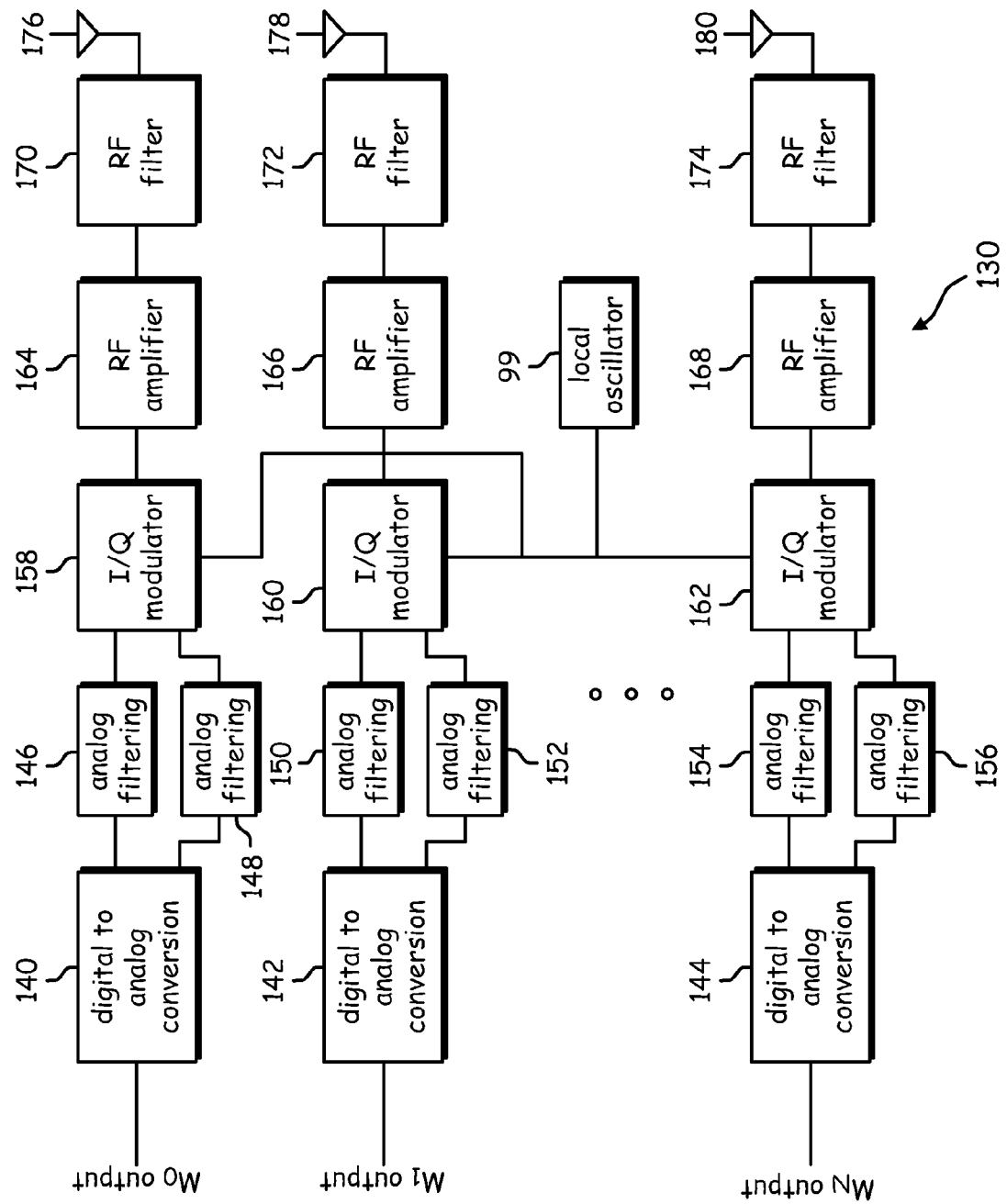

FIGS. 3A and 3B illustrate a more detailed schematic block diagram of an exemplary multiple transmit path transmitter (e.g., including baseband processing module 64 and RF transmitters 68-72 of the radio transceiver 60 of FIG. 2) using Orthogonal Frequency Division Multiplexing (OFDM) in accordance with the present invention. FIG. 3A illustrates an exemplary baseband processing portion 100 of a transmitter, while FIG. 3B illustrates an exemplary radio portion 130 of the transmitter. In FIG. 3A, the baseband processing portion 100 is shown to include a scrambler 102, channel encoder 104, a plurality of interleavers 106-108, a plurality of symbol mappers 110-112, a plurality of tone mappers 113-115, plurality of inverse fast Fourier transform (IFFT)/cyclic prefix addition modules 116-120 and plurality of digital filter/up-sampling modules 124-128. The baseband portion of the transmitter 100 may further include a mode manager module 105 that receives the mode selection signal 101 and produces a rate and transmit mode selection signal 101 for the baseband portion of the transmitter.

In operation, the scrambler 102 adds a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 104 receives the scrambled data and generates a new sequence of bits with redundancy. This will enable improved detection at the receiver. The channel encoder 104 may operate in one of a plurality of modes. For example, in IEEE 802.11(a) and IEEE 802.11(g), the channel encoder has the form of a rate ½ convolutional encoder with 64 states and a generator polynomials of $G_0=133_8$ and $G_1=101_8$. The output of the convolutional encoder may be punctured to rates of ½, ⅔ and ¾ according to specified rate tables. For backward compatibility with IEEE 802.11(b) and the CCK modes of IEEE 802.11(g), the channel encoder has the form of a CCK code as defined in IEEE 802.11(b). For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. In other embodiments, there may be multiple channel encoders, instead of the single channel encoder 104 shown in FIG. 3A.

The channel encoder 104 further converts the serial encoded data stream into M-parallel streams for transmission and provides the M-parallel streams to interleavers 106-108. The interleavers 106-108 receive the encoded data streams and spread the encoded data streams over multiple symbols and multiple transmit paths. This allows improved detection and error correction capabilities at the receiver. In one embodiment, the interleavers 106-108 follow the IEEE 802.11(a) or (g) standard in the backward compatible modes. In another embodiment, the interleavers 106-108 follow the IEEE 802.11(n) standard. In other embodiments, there may be different configurations of the encoder/scrambler/interleaver, such as combinations of single or multiple interleavers, single or multiple encoders, single or multiple scramblers and single or multiple spatial demultiplexers for demultiplexing the serial data stream into M-parallel streams.

Each symbol mapper 110-112 receives a corresponding one of the M-parallel paths of data from interleavers 106-108. Each tone mapper 113-115 maps bit streams to quadrature amplitude modulated QAM symbols (e.g., BPSK, QPSK, 16 QAM, 64 QAM, 256 QAM, et cetera) for each tone of an OFDM channel according to a specific rate table. For IEEE 802.11(a) backward compatibility, double gray coding may be used. The QAM symbols for each tone collectively form a frequency domain OFDM symbol. Each tone mapper 113-115 generate the tones (e.g., subcarriers of an OFDM channel) for a particular transmit antenna, in which each tone contains a sequence of QAM frequency domain symbols. This may also include empty guard tones or pilot tones, i.e., tones known to the receiver.

The complex QAM tone amplitudes produced by each of the tone mappers 113-115 are provided to the IFFT/cyclic prefix addition modules 116-120, which perform frequency domain to time domain conversions and optionally add a prefix, which allows removal of inter-symbol interference at the receiver. For example, a 64-point IFFT can be used for 20 MHz channels and 128-point IFFT can be used for 40 MHz channels. The output of the IFFTs 116-120 are respective time domain OFDM symbols to be transmitted in a respective channel. Each time domain OFDM symbol is a superposition of the time domain QAM symbols for each of the tones. The digital filtering/up-sampling modules 124-128 filter the corresponding symbols and adjust the sampling rates to correspond with the desired sampling rates of the radio portion of the transmitter 100.

FIG. 3B illustrates the radio portion 130 of the transmitter 100 that includes a plurality of digital-to-analog conversion modules 140-144, analog filters 146-156, I/Q modulators 158-162, RF amplifiers 164-168, RF filters 170-174 and antennas 176-180. The M-outputs from the digital filtering/up-sampling modules 124-128 are received by respective digital-to-analog conversion modules 140-144. In operation, the number of radio paths that are active correspond to the number of M-outputs. For example, if only one M-output path is generated, only one of the radio transmitter paths will be active. As one of average skill in the art will appreciate, the number of output paths may range from one to any desired number.

The digital-to-analog conversion modules 140-144 convert the digital filtered and up-sampled signals into corresponding in-phase and quadrature analog signals. The analog filters 146-156 filter the corresponding in-phase and/or quadrature components of the analog signals, and provide the filtered signals to the corresponding I/Q modulators 158-162. The I/Q modulators 158-162 based on a local oscillation, which is produced by a local oscillator 99, up-converts the I/Q signals into radio frequency signals. The RF amplifiers 164-168 amplify the RF signals which are then subsequently filtered via RF filters 170-174 before being transmitted via antennas 176-180.

Figure 4:
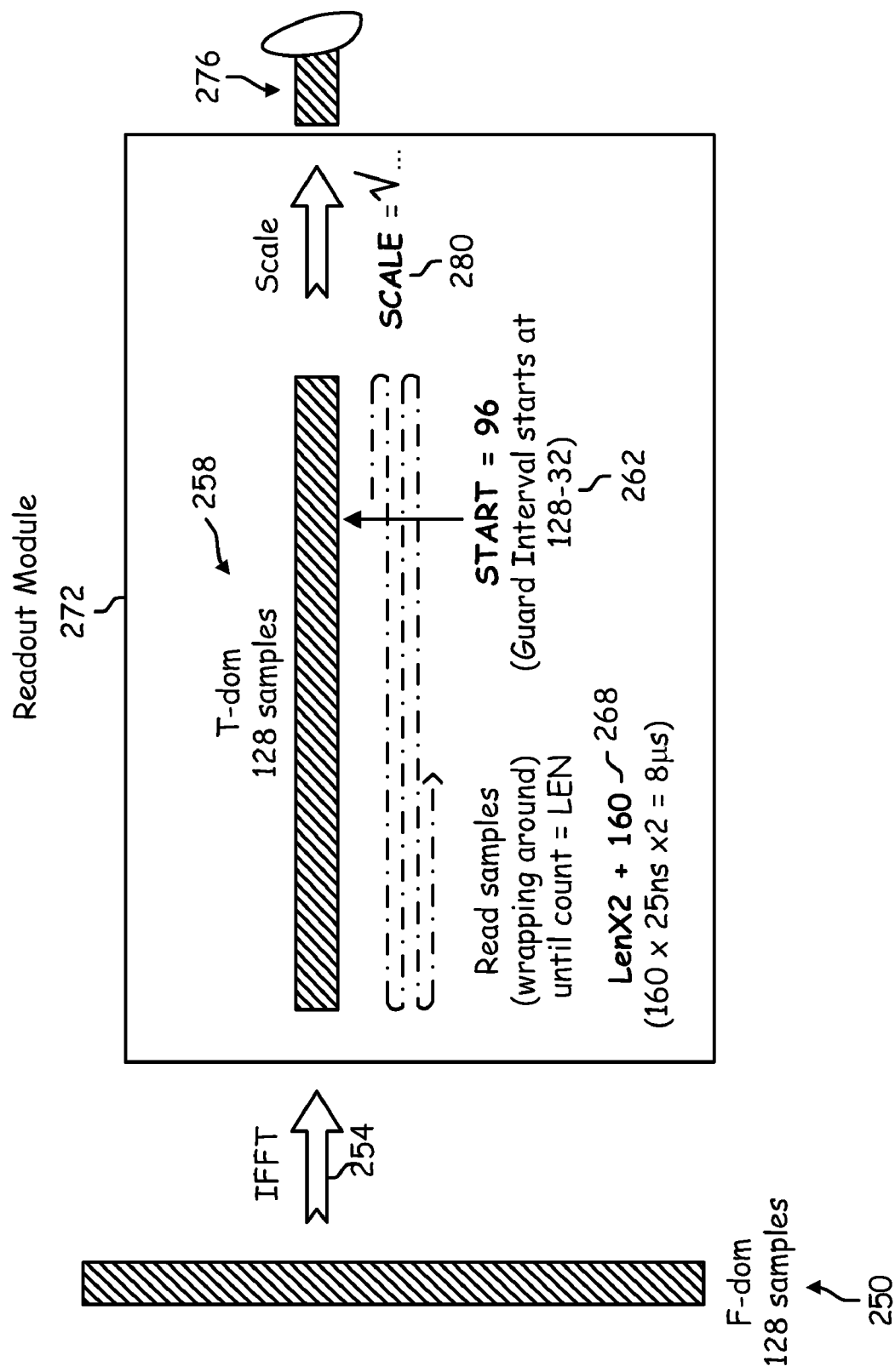
FIG. 4 is a diagram illustrating the generation of time domain training symbols from frequency domain training symbols using the programmable transmitter of FIG. 3 in accordance with embodiments of the present invention.

FIG. 4 is a diagram illustrating the generation of time domain OFDM training samples from frequency domain QAM training symbols given per tone in accordance with the present invention. In FIG. 4, the frequency domain QAM training symbol 250 for each tone obtained for a training sequence segment. In one system used with the embodiments of the invention, tone map tables provide the tones that are input to the IFFT 254 to convert all of the frequency domain QAM training symbols 250 to a time domain OFDM training symbol 258 containing a number of samples of symbols 250. Using the starting sample 264 and length 268 in the frame structure table, the readout module 272 generates the complete time domain OFDM training symbol at the indicated length 268 and beginning at the indicated starting sample 264. For example, as shown in FIG. 4, each frequency domain training segment has a length of 128 symbol samples 250 and the time domain OFDM training symbol 258 (which is a superposition of the time domain QAM symbols per tone) has an initial length of 128 samples. The readout module 272 begins at sample 96 and reads out the samples in order wrapping around to the first sample until the length of the time domain symbol sequence equals the specified length 268. The readout module 272 further scales the time domain OFDM training symbol 258 by the scaling factor 280 in the frame structure tables. The scaling factor is applied to the complete time domain OFDM training symbol 258 to scale the magnitude of the symbol, and the scaled time domain OFDM training symbol 276 is output by the readout module 272. It should be noted that in the embodiment shown in FIG. 4, the number of samples to be generated is given by two times the number stored in the LenX2 field 268 to save one bit in the bitwidth of each sub-entry of a frame structure table. However, in other embodiments, the length (total number of samples requested for a given frame segment) could be specified directly in the length field 268, i.e., without the factor 2 modification.

FIG. 4 illustrates but one embodiment of performing a cyclic shift for the purpose of avoiding signal cancellation due to the formation of nulls that may occur without such cyclic shifts due to signal alignment. It should be understood that other variations or specific steps for performing a cyclic shift may utilized without departing from the scope of the teachings herein for the various embodiments of the invention. Further, such cyclic shifts may be performed on any portion of the preamble including, as in the embodiments of the invention, on the short and long training sequences.

Figure 5:
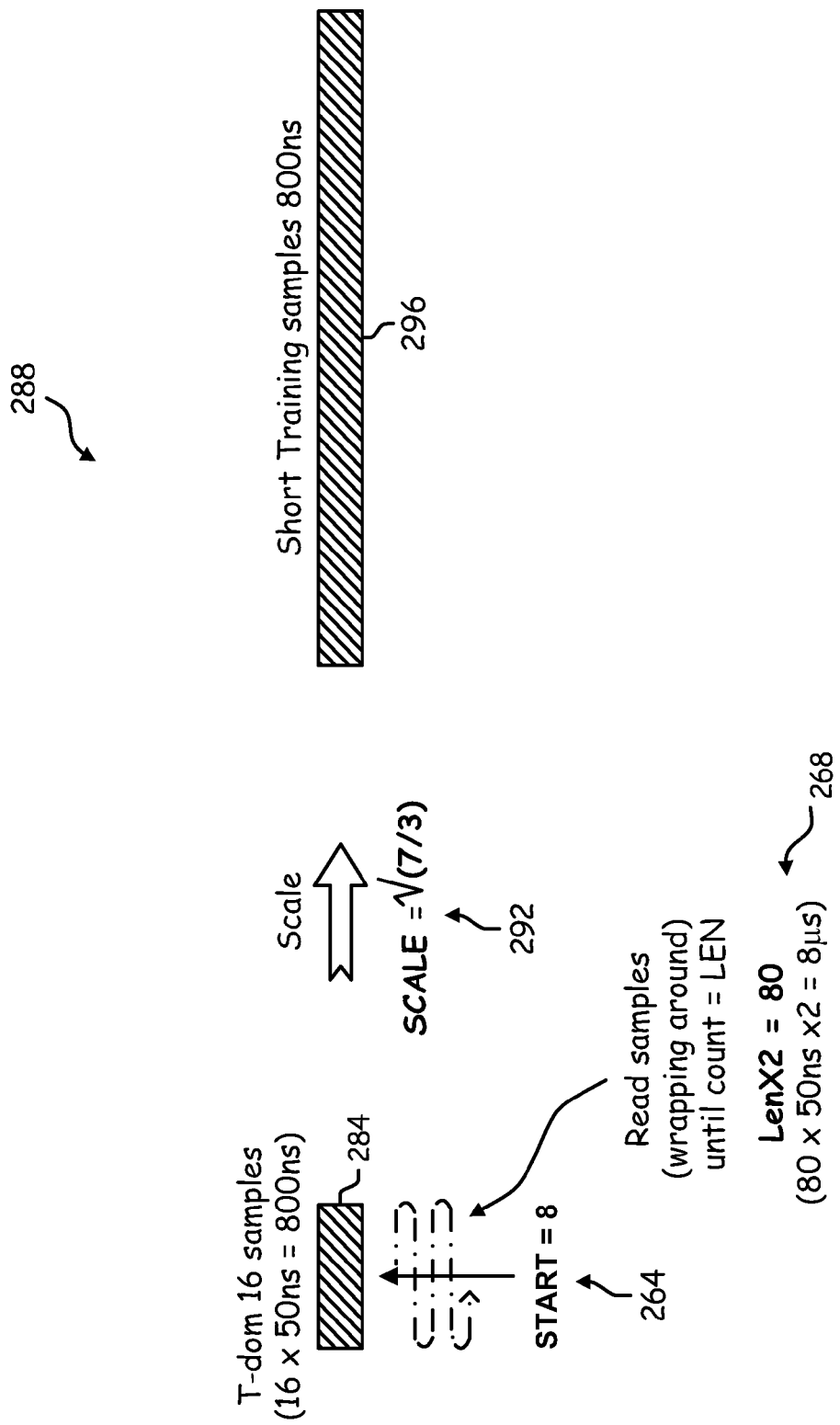
FIG. 5 is a diagram illustrating the generation of training symbols in the time domain using the programmable transmitter of FIG. 5 in accordance with the present invention.

FIG. 5 is a diagram illustrating the generation of a sequence of OFDM training symbols in the time domain in accordance with the present invention. In FIG. 5, the time domain OFDM training symbols 284 are obtained from the time domain time-domain sequence tables and input to a time-domain sequence engine 288. Using the starting sample 264 and length 268 in a frame structure table, the time-domain sequence engine 288 generates the complete sequence of time domain OFDM training symbols at the indicated length 268 and beginning at the indicated starting sample 264. For example, as shown in FIG. 5, the sequence time domain OFDM training symbols 284 have an initial length of 16 samples. The time-domain sequence engine 288 begins at sample 8 and reads out the samples in order wrapping around to the first sample until the length of the time domain OFDM symbol sequence equals the specified length 268. Again, in this example and corresponding embodiment, the true length in number of samples to be generated by the time domain sequence engine is given by two times LenX2, that it, 2*80=100 overall samples. The time-domain sequence engine 288 further scales the time domain OFDM training symbols by the scaling factor 292 stored in the frame structure tables. The scaling factor is applied to the complete sequence of time domain OFDM training symbols to scale the magnitude of the symbols, and the scaled time domain OFDM training symbols 296 are output by the time-domain sequence engine 288.

The above described embodiments of the invention or alternatives therefor, may also be used to provide a cyclic shift for any portion of a high data rate or mixed mode signal field. Additionally, it is desirable to provide a uniform approach to generating preambles for different transmission modes. For example, in a high data rate transmission mode, a so-called Greenfield mode, a basic formation includes a 24 microsecond pre-amble for transmission of only one stream and an additional 4 microseconds for each additional stream. In a legacy or mixed mode, a pre-amble is allocated 36 microseconds for transmission of only one stream and an additional 4 microseconds for each additional stream. The number of streams equals the number of outputs from STBC encoder. The short training sequence (SS) is 20 MHz and 40 MHz for the Greenfield. For this embodiment, beam forming, if applied, covers the entire pre-amble. With these considerations in mind, it should also be understood that the steps of performing a cyclic shift as described above may be applied to the formation of the SS or the LS within the pre-amble regardless of whether the preamble is for a mixed mode or a Greenfield mode signal.

Figure 6:
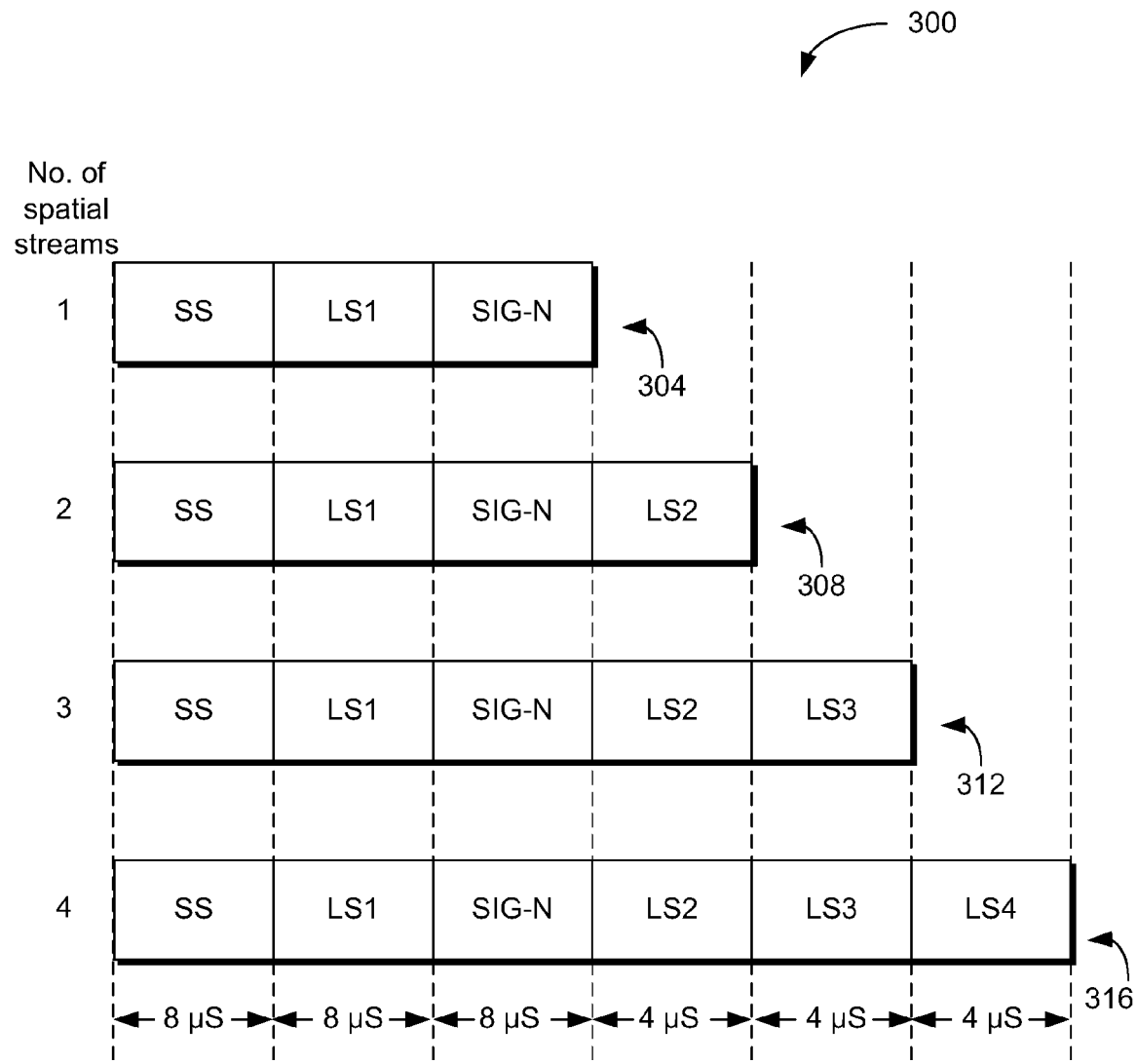
FIGS. 6 and 7 are illustrations of exemplary embodiments of the invention of high data rate and mixed mode preamble signal formats.

To illustrate one embodiment of a preamble according to one embodiment of the invention, FIG. 6 illustrates a high data rate pre-amble format (e.g., a modified Greenfield format) for 1-4 spatial streams. As may be seen, the preamble formats shown generally at 300, four preamble formats are shown at rows 304-316 for 1-4 signal streams that are to be transmitted from a corresponding number of antennas. The short training sequence (SS), the first long training sequence (LS1) and the signal field (SIG-N) are each 8 microseconds long while the each subsequent long training sequence (LS2, LS3 and LS4) is 4 microseconds long and adds 4 microseconds to the length (period) of the preamble.

To be more specific regarding the preamble lengths, LS1 is 8 microseconds (2 symbols+2 added guard interval periods) wherein the guard interval periods are also known as "cyclic prefixes". LS2-LS4, if present, are each an additional 4 microseconds (1 symbol+1 GI).

Referring now to row 304 of FIG. 6, which illustrates transmission from only one spatial stream, a short training sequence SS is followed by a long training sequence LS1 and a signal field SIG-N in the described embodiment of the invention. The short training sequence SS is formed according to 802.11(a) specified formats in the described embodiment of the invention and carries a small set of frequency tones. Specifically, SS comprises ten tones that are each 0.8 microseconds in length. These tones are used by a receiver for one or more purposes including automatic gain control for the incoming signals. Long training sequences, such as LS1, are for enabling the receiver to perform channel estimation for the associated channel or spatial signal stream. A signal field, labeled as SIG-N, follows the first long training sequence. The signal field is for carrying transmission related information including, for example, number of spatial streams, constellation size and bits per symbol in one embodiment. Each of the SS, LS1 and SIG-N fields (including guard intervals) are eight microseconds long in the described embodiment of the invention.

The preceding paragraph defines a pre-amble format for a transmission of one data stream from one antenna. If the transmission is to include additional streams from additional antennas, an additional long training sequence is required for each additional stream to train a receiver properly to enable the receiver to process the incoming streams transmitted from the plurality of antennas. Each additional long training sequence adds 4 microseconds of duration to the length of the preamble. For example, row 316 of FIG. 6 illustrates a field for SS, LS1 and SIG-N as well as a field having a 4 microsecond period for each additional long training sequence shown as LS2, LS3 and LS4 for a transmission that includes four spatial streams.

In the described embodiment of the invention, four long training sequences are generated for transmissions of either 3 or 4 streams. In an alternate embodiment, only three long training sequences (LS1, LS2, LS3) are generated if only three streams are to be transmitted. Finally, it should be noted that every field and, thus, the total length of the preamble is equal to a whole multiple of 4 microseconds. Because of real world variations from design due to process and other variations, an actual period may vary slightly from the specified amounts. Thus, to be more accurate, each field length each total calculated length is approximately equal to a whole multiple of 4 microseconds. In the described embodiment, each stream is transmitted at the same frequency as the other streams and is orthogonal relative to the other streams. Additionally, each stream is cyclic shifted in the time domain to effectively phase shift each stream relative to each other in the frequency domain. For example, samples of a second stream may be cyclic shifted relative to a first stream by a first amount. Samples of a third streams may be cyclic shifted by a second amount relative to the first stream. For each subsequent stream, the samples a cyclic shifted by a different amount relative to the first stream. Generally, the use of cyclic shifting avoids tones inadvertent canceling each other by creating a null at the receiver. Finally, it should be mentioned that the entire preamble for a high data rate (Greenfield) transmission is transmitted with beam forming techniques in the described embodiment of the invention. While FIG. 6 and subsequent figures may refer to four or less spatial streams, it is to be understood that the principles disclosed apply in equal force to preambles for five or more spatial streams.

Figure 7:
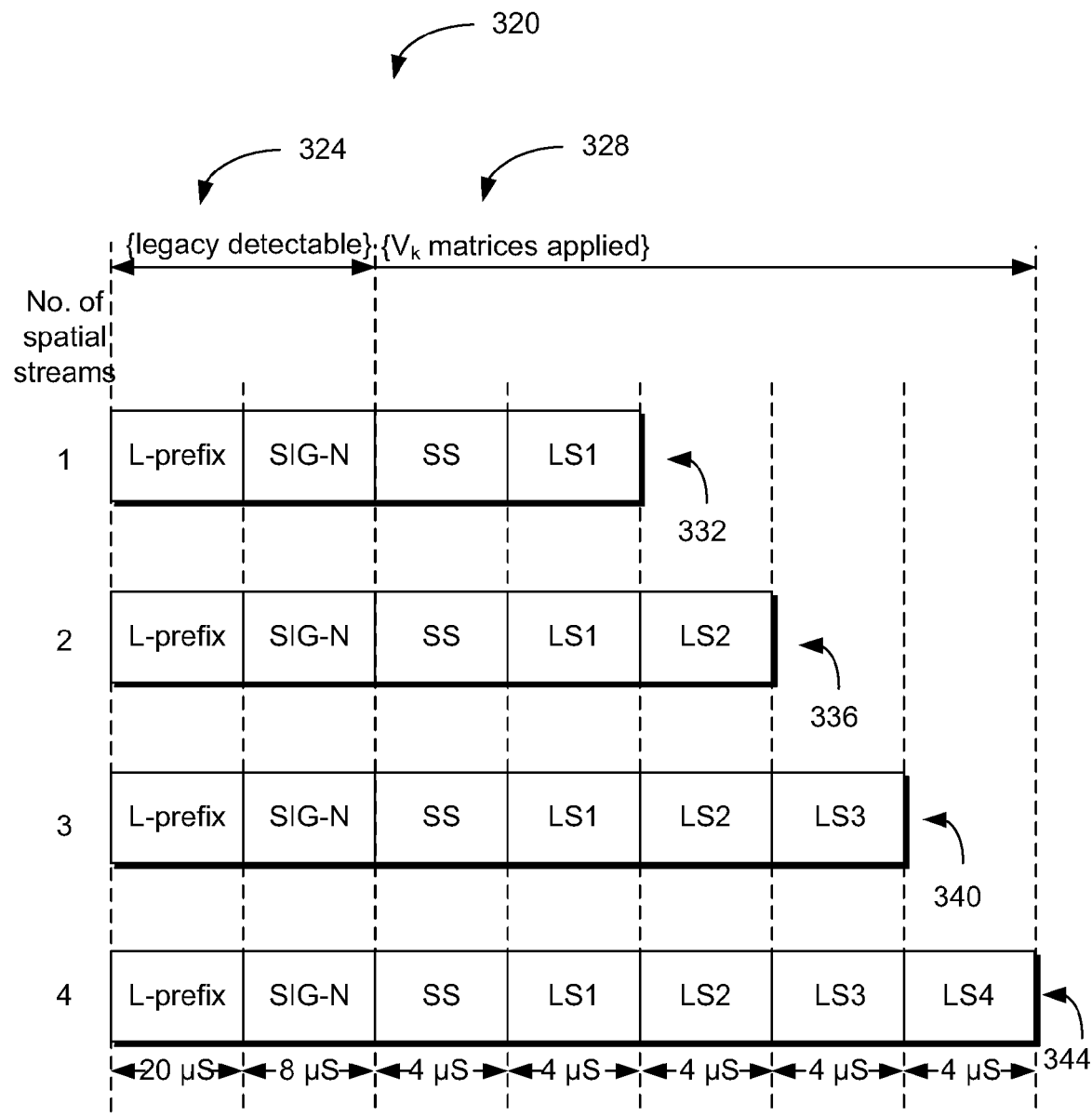

FIG. 7 is an example of a mixed mode pre-amble according to one embodiment of the invention. The preamble for mixed mode transmission in this embodiment are shown generally at 320 includes a 20 microsecond legacy prefix that includes a short training sequence SS. A legacy detectable portion 324 of each preamble further includes a SIG-N signal field that follows the legacy prefix (L-prefix). The SIG-N field is detectable though not readable by a legacy device. The preamble further includes a short training sequence SS and a long training sequence LS1. Both the legacy prefix and the signal field are shown generally at 324 to represent that the signal is legacy device readable. Remaining fields shown generally at 328 are readable by high data rate (non-legacy) mixed mode receivers. The second short training sequence shown as "SS" in each of the rows 332-344 is added to accommodate automatic gain control (AGC) adjustments that may be necessary for beam forming applications. If beam forming is used, beam forming is applied to signal fields that are transmitted after the SIG-N field in the portion shown generally at 328. In the described embodiment of the invention, SIG-N is modulated using r=½ BCC64 encoding with a +90 degree rotated BPSK modulation using two symbol durations (8 microseconds).

The same modulation is used for Greenfield (high data rate) and mixed mode transmissions for the SIG-N signal fields.

As an additional aspect of the present invention, one embodiment includes a long training sequence having the following characteristics as shown in Tables 1 and 2. For a single stream, the long training sequence is characterized by 0.11aLT as defined in the IEEE 802.11a-1999 standards in the described embodiment. Generally, though, any complex symbol sequence (one constellation point per subcarrier) may be utilized. For a two stream mode of operation, the first stream for first and second time periods (symbol intervals) may be characterized also by 0.11aLT as shown in Table 1 below.

A second stream, however, is phase shifted relative the first stream and is represented by $-0.11aLT*e^{j*\theta(t)}$ or $0.11aLT*e^{j*\theta(K)}$ in the first and second time periods where K is the subcarrier index. As is shown in Table 3, for a 3 stream mode of operation, the first stream for first, second and third time periods may be characterized also by 0.11aLT*W11, 0.11aLT*W12 and 0.11aLT*W13, respectively, as shown in the table. A second stream, however, is phase shifted relative the first stream and is represented by $0.11aLT*W21*e^{j*\theta(K)}$, $0.11aLT*W22*e^{j*\theta(K)}$ and $0.11aLT*W23*e^{j*\theta(K)}$ wherein, in the first, second and third time periods respectively K is the subcarrier index.

A third stream is represented by $0.11aLT*W31*e^{j*\phi(K)}$, $0.11aLT*W32*e^{j*\phi(K)}$ and $0.11aLT*W33*e^{j*\phi(K)}$ respectively for the first, second and third time periods. "Wmn" refers to DFT Matrix elements and theta (θ) and phi (φ) represent subcarrier phase shifts as is known by one of average skill in the art.

In a system operating in a 4 stream mode of operation, the subcarrier phase shifts are represented by theta (θ), and phi (Φ) and psi (ψ). As before, each column represents a time period. The polarity and phase for the modulation of the long training sequence for each stream is shown in Table 3.

TABLE 1

| | Long training sequence for two streams | |
|---|---|---|
| Stream | first period | second period |
| 1 | .11aLT | .11aLT |
| 2 | $-.11aLT*e^{j*\theta(t)}$ | $.11aLT*e^{j*\theta(t)}$ |

TABLE 2

| | Long training sequence for three streams | | |
|---|---|---|---|
| Stream | first period | second period | third period |
| 1 | .11aLT*W11 | .11aLT*W12 | .11aLT*W13 |
| 2 | $.11aLT*W21*e^{j*\theta(K)}$ | $.11aLT*W22*e^{j*\theta(K)}$ | $.11aLT*W23*e^{j*\theta(K)}$ |
| 3 | $.11aLT*W31*e^{j*\phi(K)}$ | $.11aLT*W32*e^{j*\phi(K)}$ | $.11aLT*W33*e^{j*\phi(K)}$ |

TABLE 3

| | Long training sequence for four streams | | | |
|---|---|---|---|---|
| Stream | first period | second period | third period | fourth period |
| 1 | $-1*.11aLT$ | .11aLT | .11aLT | .11aLT |
| 2 | $.11aLT*e^{j*\theta(K)}$ | $-1*.11aLT*e^{j*\theta(K)}$ | $.11aLT*e^{j*\theta(K)}$ | $.11aLT*e^{j*\theta(K)}$ |
| 3 | $.11aLT*e^{j*\phi(K)}$ | $.11aLT*e^{j*\phi(K)}$ | $-1*.11aLT*e^{j*\phi(K)}$ | $.11aLT*e^{j*\phi(K)}$ |
| 4 | $.11aLT*e^{j*\psi(K)}$ | $.11aLT*e^{j*\psi(K)}$ | $.11aLT*e^{j*\psi(K)}$ | $-1*.11aLT*e^{j*\psi(K)}$ |

From examining the above, the per carrier phase shifts are implemented with simple cyclic delays. The above alternate embodiments for high data rate (Greenfield) and mixed mode (legacy) transmissions keeps pre-ambles as short as possible, provides a robust signal field, and supports simplified receiver processing. Four microsecond boundaries are utilized for all fields and orthogonal long training is employed.

One object of a mixed mode transmission is to support high data rate transmissions is a way that is compatible with legacy devices. As a part of maintaining compatibility, it is advantageous to advise a legacy device to remain silent while the mixed mode transmitter generates communication signals to reduce interference between transmitters. If a high data rate transmitter such as a Greenfield transmitter were to merely transmit, a legacy device may transmit at the same time creating interference between associated communication links. Thus, advantageously, the mixed mode transmitter disclosed herein in FIG. 7 is operable to generate a preamble that enables a different transmitter (a legacy device) to determine to remain silent for the duration of the transmission of the mixed mode frame. Effectively, the legacy field and the short training sequence are operable to advise other legacy and non-legacy transmitters to remain silent. Such protection of the communication channel is known as "phi-layer" protection.

Figure 8:
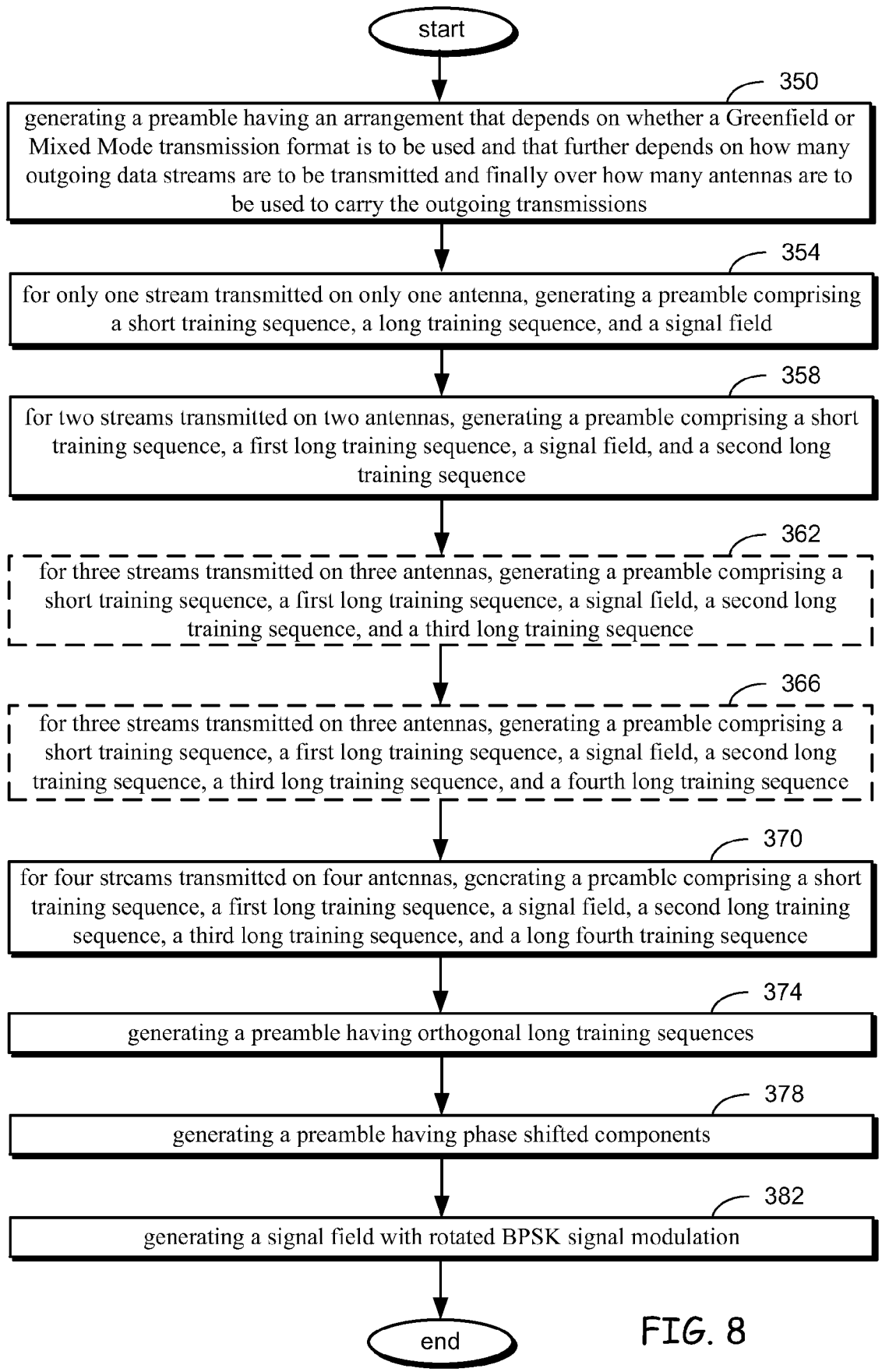
FIG. 8 is a flow chart that illustrates an embodiment of the invention for a method for generating a preamble either for high data rate or mixed mode transmissions over one or more spatial streams.

FIG. 8 is a flow chart of a method according to one embodiment of the invention. Generally, the invention includes generating a preamble with an arrangement that depends upon whether a Greenfield (high data rate) or Mixed Mode transmission is to occur and that depends upon a number of spatial streams that are to be generated. Thus, the method includes generating a preamble having an arrangement that depends on whether a Greenfield or Mixed Mode transmission format is to be used and that further depends on how many outgoing data streams are to be transmitted and finally over how many antennas are to be used to carry the outgoing transmissions (step 350). Thus, for a transmission in which only one stream is to be transmitted on only one antenna, the method includes generating a preamble comprising a short training sequence, a long training sequence, and a signal field (step 354). If a mixed mode signal is to be transmitted for one or more spatial streams, the method according to one embodiment, includes generating a legacy prefix to advise legacy devices to not transmit for a specified period. For a transmission in which two streams are to be transmitted on two antennas, the method includes generating a preamble comprising a short training sequence, a first long training sequence, a signal field, and a second long training sequence (step 358). For a transmission in which three streams are to be transmitted on three antennas, the method includes generating a preamble comprising a short training sequence, a first long training sequence, a signal field, a second long training sequence, and a third long training sequence (step 362).

Alternatively, for three streams that are to be transmitted on three antennas, the method includes generating a preamble comprising a short training sequence, a first long training sequence, a signal field, a second long training sequence, a third long training sequence, and a fourth training sequence (step 366). For four streams that are to be transmitted on four antennas, the method includes generating a preamble comprising a short training sequence, a first long training sequence, a signal field, a second long training sequence, a third long training sequence, and a fourth training sequence (step 370). As may be seen, each of the steps 354 through 370 are alternative to each and generally depend on the number of streams that are to be produced over a corresponding number of antennas. Additionally, steps 362 and 366 are alternative to each other for three streams and are a matter of design choice.

The method of the embodiment of FIG. 8 further includes generating phase shifted and orthogonal long training sequences and generating a signal field with rotated BPSK signal modulation in one described embodiment of the invention. In alternative embodiments, only some of these aspects are of the invention are included. Thus, one embodiment includes forming a preamble with orthogonal long training sequences (step 374). The embodiment of the invention further includes forming a preamble having a phase shifted (frequency domain) signal whose phase shift is created by cyclic shifts in the time domain, as well as having orthogonal short and long training sequences and a signal field (step 378). Finally, the invention includes generating a signal field (e.g., SIG-N) with rotated BPSK signal modulation (step 382). In this embodiment, the BPSK modulation is rotated by a minus 90 degrees ($-\pi/2$ radians) to place the modulation onto the quadrature axis. Alternatively, the BPSK modulation may be rotated by a different amount (e.g., $+\pi/2$ radians).

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

The preceding discussion has presented a programmable transmitter for generating frames of different formats according to different operating modes. As one of ordinary skill in the art will appreciate, other embodiments may be derived from the teachings of the present invention without deviating from the scope of the claims.

What is claimed is:

1. A transmitter, comprising:
a processor operable to generate one or more outgoing digital signal streams for transmission over one or more antennas substantially at the same time according one of a high data rate transmission format and a mixed mode transmission format based on a selected transmission mode of operation; and
wherein the transmitter:
generates a high data rate preamble according to a high data rate transmission preamble format for outgoing high data rate transmission format digital signal streams, the high data rate preamble format having a variable period determined by a number of streams to be transmitted; and
generates a mixed mode preamble according to a mixed mode transmission preamble format for outgoing mixed mode transmission format digital signal streams.

2. The transmitter of claim 1, wherein, for high data rate transmission format digital signal streams, the preamble format comprises:
a 24 microsecond period; and
one or more additional 4 microsecond periods depending on the number of streams that are to be transmitted.

3. The transmitter of claim 2, wherein the high data rate preamble format includes:
a 24 microsecond period;
a first additional 4 microsecond period for a first stream;
a second additional 4 microsecond period for a second stream; and
third and fourth additional 4 microsecond periods for a third stream.

4. The transmitter of claim 1, wherein preamble format for the high data rate transmission format digital signal streams includes fields for a short training sequence, a first long training sequence, and a signal field.

5. The transmitter of claim 4, wherein the high data rate transmission format digital signal streams preamble format fields are arranged sequentially, relative to each other, in the order of short training sequence, the first long training sequence, and signal field.

6. The transmitter of claim 5, wherein the high data rate transmission format digital signal streams preamble format comprises:
a 28 microsecond period and a second long training sequence following the signal field if two signal streams are being transmitted;

a 32 microsecond period and a third long training sequence following the second long training sequence if three signal streams are being transmitted; and a 36 microsecond period and a fourth long training sequence following the third long training sequence if four signal streams are being transmitted.

7. The transmitter of claim 1, wherein each preamble format comprises a period that is approximately a whole multiple of 4.0 microseconds.

8. The transmitter of claim 1, wherein, for a format digital signal streams, the preamble format comprises:

a 36 microsecond period if only one stream is to be transmitted; and a 36 microsecond period plus 4 microseconds for each additional stream that is to be transmitted.

9. The transmitter of claim 8, wherein the mixed mode transmission format outgoing digital signal streams preamble format includes fields for carrying legacy information, a signal field, a short training sequence, and a first long training sequence.

10. The transmitter of claim 9, wherein the mixed mode transmission format outgoing digital signal streams preamble format includes fields that are arranged sequentially, relative to each other, in the order of legacy information, the signal field, the short training sequence, and the first long training sequence.

11. The transmitter of claim 10, wherein the mixed mode transmission format outgoing digital signal streams preamble format comprises:

a 40 microsecond period and a second long training sequence following the signal field if two signal streams are being transmitted;

a 44 microsecond period and a third long training sequence following the second long training sequence if three signal streams are being transmitted; and a 48 microsecond period and a fourth long training sequence following the third long training sequence if four signal streams are being transmitted.

12. The transmitter of claim 11, wherein the first long training sequence is one of 4 or 8 microseconds long.

13. The transmitter of claim 1, wherein the short training sequence and each long training sequence is phase shifted in the frequency domain by performing a cyclic shift of a series of samples in the time domain.

14. The transmitter of claim 1, wherein the signal field is generated with a rotated BPSK modulation.

15. The transmitter of claim 1, wherein, for a plurality of streams, each short training sequence is an orthogonal sequence relative to each of the other short training sequences.

16. The transmitter of claim 1, wherein, for a plurality of streams, each long training sequence is an orthogonal sequence relative to each of the other long training sequences.

17. The transmitter of claim 1, wherein the short training sequence and each long training sequence is phase shifted in the frequency domain by performing a cyclic shift of a series of samples in the time domain.

18. The transmitter of claim 1, wherein the signal field is generated with a rotated BPSK modulation.

19. The transmitter of claim 1, wherein, for a plurality of streams, each short training sequence is an orthogonal sequence relative to each of the other short training sequences.

20. The transmitter of claim 1, wherein, for a plurality of streams, each long training sequence is an orthogonal sequence relative to each of the other long training sequences.

* * * * *

UNITED STATES PATENT AND TRADEMARK OFFICE
CERTIFICATE OF CORRECTION

| | |
|---|---|
| PATENT NO. | : 8,170,504 B2 |
| APPLICATION NO. | : 13/116227 |
| DATED | : May 1, 2012 |
| INVENTOR(S) | : Jason A. Trachewsky et al. |

It is certified that error appears in the above-identified patent and that said Letters Patent is hereby corrected as shown below:

In the Claims:

Col. 14, line 24, in claim 1: after "same time according" insert --to--

Signed and Sealed this
Fourth Day of June, 2013

Teresa Stanek Rea
*Acting Director of the United States Patent and Trademark Office*